(12) United States Patent
Okamura

(10) Patent No.: US 11,180,614 B2
(45) Date of Patent: Nov. 23, 2021

(54) POLYSILOXANE MONOMER AND METHOD FOR PREPARING THE SAME

(71) Applicant: SHIN-ETSU CHEMICAL CO., LTD., Tokyo (JP)

(72) Inventor: Kaoru Okamura, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 7 days.

(21) Appl. No.: 16/603,968

(22) PCT Filed: Mar. 30, 2018

(86) PCT No.: PCT/JP2018/013822
§ 371 (c)(1),
(2) Date: Oct. 9, 2019

(87) PCT Pub. No.: WO2018/190158
PCT Pub. Date: Oct. 18, 2018

(65) Prior Publication Data
US 2020/0148831 A1 May 14, 2020

(30) Foreign Application Priority Data

Apr. 10, 2017 (JP) .............................. JP2017-077541

(51) Int. Cl.
| C08G 77/20 | (2006.01) |
| C08G 65/14 | (2006.01) |
| C08G 77/12 | (2006.01) |
| C08G 77/26 | (2006.01) |
| C08G 77/28 | (2006.01) |
| C08J 3/075 | (2006.01) |
| G02C 7/04 | (2006.01) |

(52) U.S. Cl.
CPC ............. *C08G 77/20* (2013.01); *C08G 65/14* (2013.01); *C08G 77/12* (2013.01); *C08G 77/26* (2013.01); *C08G 77/28* (2013.01); *C08J 3/075* (2013.01); *G02C 7/04* (2013.01)

(58) Field of Classification Search
CPC ........ C08G 77/20; C08G 77/12; C08G 77/28; C08G 65/02; C08G 65/14; G02C 7/04; G02B 1/043
See application file for complete search history.

(56) References Cited

U.S. PATENT DOCUMENTS

| 2014/0135408 A1 | 5/2014 | Wang et al. |
| 2015/0011669 A1* | 1/2015 | Phukan ............... C08F 290/062 523/107 |

FOREIGN PATENT DOCUMENTS

| GB | 1096898 A | 12/1967 |
| JP | 2007-186709 A | 7/2007 |
| JP | 4882136 B2 | 2/2012 |
| JP | 2014-505067 A | 2/2014 |
| JP | 2015-96471 A | 5/2015 |
| JP | 2015-515514 A | 5/2015 |
| JP | 2016-102159 A | 6/2016 |
| JP | 2016-204313 A | 12/2016 |

OTHER PUBLICATIONS

Extended European Search Report dated Jul. 22, 2020 for Application No. 18784521.9.
International Search Report, issued in PCT/JP2018/013822, dated May 15, 2018.
Written Opinion of the International Searching Authority, issued in PCT/JP2018/013822, dated May 15, 2018.

* cited by examiner

*Primary Examiner* — Kuo Liang Peng
(74) *Attorney, Agent, or Firm* — Birch, Stewart, Kolasch & Birch, LLP.

(57) ABSTRACT

A compound represented by the formula (1) is described, which has a linear polysiloxane structure at the end, a polymerizable group at the other end, and a polyether group or a hydrophilic group as a side chain bounded to a linking group which is represented by $-(L^1)_a-CH-L^2-$ in the formula (1) and exists between the polysiloxane structure and the terminal polymerizable group. The compound has excellent compatibility with a hydrophilic monomer, and the surface wettability of hydrogel obtained from the compound as a monomer is improved. Methods are also described for preparing the polysiloxane monomer compound, a polymer having a repeating unit derived from the polymerization at the (meth)acryl group of the polysiloxane monomer compound, and an ophthalmic device containing the polymer.

19 Claims, No Drawings

POLYSILOXANE MONOMER AND METHOD FOR PREPARING THE SAME

TECHNICAL FIELD

The present invention relates to a polysiloxane monomer. Specifically, the present invention provides a polysiloxane monomer suitable for preparing an ophthalmic device and a method for preparing the monomer.

BACKGROUND ART

Monomers having a siloxane structure are known for preparing an ophthalmic device. For example, 3-[tris(trimethylsiloxy)silyl]propyl methacrylate (TRIS) is widely used as a monomer for soft contact lens. A polymer obtained by co-polymerizing TRIS and a hydrophilic monomer, such as N,N-dimethylacrylamide or N-vinyl-2-pyrrolidone, has a useful characteristic, high oxygen permeability. However, a highly hydrophobic polysiloxane monomer cannot be said to have high compatibility with the aforesaid hydrophilic monomer and, therefore, has a problem of phase separation to cause white turbidity in the preparation of a silicone hydrogel for an ophthalmic device. Accordingly, it was attempted to introduce a hydroxyl group, an amide bond, or a polyether chain to a polysiloxane monomer in order to improve its compatibility with a hydrophilic monomer.

For example, bis(trimethylsiloxy)methylsilyl]propyl glycerol methacrylate (SiGMA) and, as described in Patent Literature 1, 3-[tris(trimethylsiloxy)silyl]propyl glycerol methacrylate have excellent compatibility with hydrophilic monomers, compared to TRIS, and are suitable as a monomer for preparing an ophthalmic device. Further, Patent Literature 2 describes that introduction of a polyether group as a linking group between a polysiloxane moiety and a polymerizable group improves compatibility with a hydrophilic monomer. An ophthalmic device composed of this polysiloxane monomer has a low elastic modulus and excellent oxygen permeability.

PRIOR LITERATURE

Patent Literature

Patent Literature 1: Japanese Patent Application Laid-Open No. 2007-186709
Patent Literature 2: Japanese Patent No. 4882136

SUMMARY OF THE INVENTION

Problems to be Solved by the Invention

An ophthalmic device composed of the compound described in Patent Literature 1 has good transparency and oxygen permeability, but has a disadvantage of a high elastic modulus, compared to an ophthalmic device composed of a conventional polysiloxane monomer. Further, a polyether group exists in a main chain of the monomer described in Patent Literature 2 and, therefore, does not sufficiently contribute to compatibility of the monomer, so that surface wettability of a device composed of this monomer is insufficient. Accordingly, the conventional polysiloxane monomer cannot provide an ophthalmic device having sufficient wettability while maintaining the useful oxygen permeability and low elastic modulus. Therefore, a compound and a composition which do not have the aforesaid disadvantages have been desired.

The present invention provides a polysiloxane monomer which gives an ophthalmic device with excellent wettability and a method for preparing the same.

Means for Solving the Problems

The present inventor has made research to solve the afore-mentioned problems and found that a polysiloxane monomer which has a linear polysiloxane structure at the end and has a polyether group or a hydrophilic group as a side chain of a linking group between the polysiloxane structure and a polymerizable group has excellent compatibility with other hydrophilic monomers, and a hydrogel composed of a copolymer obtained from the polysiloxane monomer and from a hydrophilic monomer has improved surface wettability.

Thus, the present invention provides a compound represented by the following formula (1):

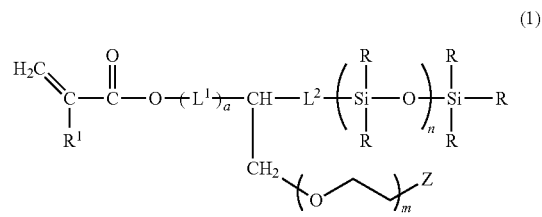

(1)

wherein $R^1$ is a hydrogen atom or a methyl group, $L^1$ is a divalent hydrocarbon group which has 1 to 6 carbon atoms and may have at least one bond selected from an ether bond, an ester bond, and an urethane bond, or two or more of these bonds, a is 0 or 1, $L^2$ is a divalent hydrocarbon group which has 2 to 10 carbon atoms and may have at least one of ether bond, Z is a monovalent organic group which has 1 to 20 carbon atoms in total and has an alkoxy group, a tertiary amino group, a quaternary ammonium group, an amphoteric ion group, or an amide bond, m is an integer of from 1 to 100, n is an integer of from 1 to 100, and R is, independently of each other, a monovalent hydrocarbon group having 1 to 10 carbon atoms.

The present invention further provides a method for preparing the polysiloxane monomer compound, a polymer having a repeating unit derived from the polymerization at the (meth)acryl group of the polysiloxane monomer compound, and an ophthalmic device containing the polymer, specifically a contact lens.

Effects of the Invention

The compound according to the present invention has a highly hydrophilic group in a side chain and, therefore, has excellent compatibility with other hydrophilic monomers. Further, a (co)polymer having a repeating unit derived from the compound according to the present invention has excellent oxygen permeability and a low modulus of elasticity. A hydrogel obtained from the (co)polymer has excellent surface wettability. The compound according to the present invention is useful as a monomer for preparing an ophthalmic device such as contact lens, intraocular lens, artificial corneas, and lens for eyewear.

DETAILED DESCRIPTION OF THE INVENTION

The compound according to the present invention will be described below in further detail.

The present compound is a polysiloxane monomer represented by the formula (1). The compound has a linear polysiloxane structure at the end and a polyether group or a hydrophilic group as a side chain bounded to a linking group which is represented by -($L^1$)$_a$-CH-$L^2$- in the formula (1) and exists between the polysiloxane structure and a terminal polymerizable group. The compound has excellent compatibility with a hydrophilic monomer, and the surface wettability of hydrogel obtained from the compound as a monomer is improved. The polysiloxane structure in the present compound is linear and is not bulky. Moreover, the hydrophilic group is a side chain of the linking group and, therefore, has high mobility, so that the polysiloxane structure is surrounded with the hydrophilic group. On account of this conformation, the compatibility and the surface wettability are improved.

In the formula (1), $R^1$ is a hydrogen atom or a methyl group. Among these, a methyl group is preferred.

In the formula (1), $L^1$ is a divalent hydrocarbon group which has 1 to 6 carbon atoms and may have at least one bond selected from an ether bond, an ester bond, and an urethane bond, or two or more of these bonds. "a" is 0 or 1 and is preferably 0.

Examples of the divalent hydrocarbon group having 1 to 6 carbon atoms include an ethylene group, a 1,3-propylene group, a 1-methylpropylene group, a 1,1-dimethylpropylene group, a 2-methylpropylene group, a 1,2-dimethylpropylene group, a 1,1,2-trimethylpropylene group, a 1,4-butylene group, a 2-methyl-1,4-butylene group, a 2,2-dimethyl-1,4-butylene group, a 3-methyl-1,4-butylene group, a 2,2-dimethyl-1,4-butylene group, a 2,3-dimethyl-1,4-butylene group, a 2,2,3-trimethyl-1,4-butylene group, a 1,5-pentylene group, and a 1,6-hexanylene group. Examples of the group having at least one of ether bond include polyalkylene oxide groups such as a polyethylene oxide group, a polypropylene oxide group, and a polyethylene-propylene oxide group.

$L^2$ is a divalent hydrocarbon group which has 2 to 10 carbon atoms and may have at least one of ether bond. Examples of the divalent hydrocarbon group include a 1,7-heptanylene group, a 1,8-octanylene group, a 1,9-nonanylene group, and a 1,10-decanylene group, in addition to the divalent hydrocarbon groups defined for $L^1$ in above. Examples of the group having at least one of ether bond include polyalkylene oxide groups such as a polyethylene oxide group, a polypropylene oxide group, and a polyethylene-propylene oxide group. Among these, —$CH_2OC_3H_6$— is preferred.

Z is a monovalent organic group which has 1 to 20 carbon atoms, preferably 1 to 10 carbon atoms, in total and has an alkoxy group, a tertiary amino group, a quaternary ammonium group, an amphoteric ion group, or an amide bond. Z is preferably a monovalent organic group which has 1 to 10 carbon atoms and has an alkoxy group, a dimethylamino group, an alkyl dimethyl ammonium group, a sulfobetaine group, or an amide bond. Z is more preferably selected from the group consisting of a methoxy group, an ethoxy group, a dimethylamino group, a methyl dimethyl ammonium group, an ethyl dimethyl ammonium group, a propyl dimethyl ammonium group, a butyl dimethyl ammonium group, and a group represented by any one of the following formulas (a) to (e)

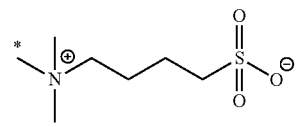

(a)

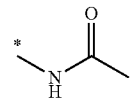

(b)

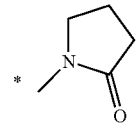

(c)

(d)

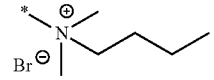

(e)

wherein the site marked with * is to bond to the carbon atom.

m is an integer of from 1 to 100, preferably an integer of from 1 to 20, more preferably an integer of from 1 to 5. n is an integer of from 1 to 100, preferably an integer of from 2 to 20, more preferably n is 4.

R is, independently of each other, a monovalent hydrocarbon group having 1 to 10 carbon atoms, preferably 1 to 6 carbon atoms. Examples of the monovalent hydrocarbon group include alkyl groups such as a methyl group, an ethyl group, a propyl group, a butyl group, a pentyl group, a hexyl group, a heptyl group, an octyl group, a nonyl group, and a decyl group; cycloalkyl groups such as a cyclopentyl group and a cyclohexyl group; and aryl groups such as a phenyl group and a tolyl group. R is preferably an alkyl group having 1 to 10 carbon atoms, preferably 1 to 6 carbon atoms or a phenyl group, more preferably a methyl group or a butyl group.

A method for preparing the compound represented by the formula (1) will be described below. The present preparation method comprises the step, hereinafter referred to as step III, of reacting an OH group-containing polysiloxane compound represented by the following formula (2):

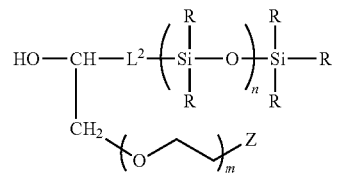

(2)

wherein $L^2$, Z, R, n and m are as defined above, with a (meth)acryl group-containing compound represented by the formula (3):

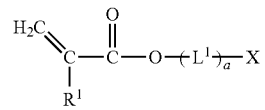

(3)

wherein $L^1$, $R^1$, and a are as defined above, and X is a halogen atom or an isocyanato group,
to obtain the compound represented by the formula (1).

The present preparation method further comprises the step, hereinafter referred to as step II, of reacting a compound represented by the following formula (4):

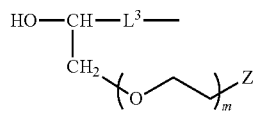
(4)

wherein $L^3$ is a monovalent hydrocarbon group which has 2 to 10 carbon atoms and having a carbon-carbon unsaturated bond at the end and may have at least one of ether bond, and Z and m are as defined above,
with a polysiloxane compound represented by the following formula (5):

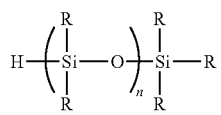
(5)

wherein R and n are as defined above,
to obtain the compound represented by the formula (2).

In the formula (4), $L^3$ is a monovalent hydrocarbon group having 2 to 10 carbon atoms which has a carbon-carbon unsaturated bond at the end and may have at least one of ether bond. $L^3$ is, for example, an alkenyl group having 2 to 10 carbon atoms. Examples of the group having at least one of ether bond may include a polyalkylene oxide having a vinyl group or an allyl group at the end, such as polyethylene oxide, polypropylene oxide, and polyethylene-propylene oxide groups. For instance, the group having an ether bond is represented by —CH$_2$OCH$_3$CH=CH$_2$. The carbon-carbon unsaturated bond reacts with the SiH group of the polysiloxane represented by the formula (5) to form $L^2$ in the formula (1).

The present preparation method further comprises the step, hereinafter referred to as step I, of reacting a primary alcohol compound represented by the following formula (6):

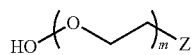
(6)

wherein Z and m are as defined above,
with an epoxy group-containing compound represented by the following formula (7):

P-$L^3$           (7)

wherein $L^3$ is a monovalent hydrocarbon group having 2 to 10 carbon atoms which has a carbon-carbon unsaturated bond at the end and may have at least one of ether bond, and P is a monovalent organic group which has 2 to 7 carbon atoms and has an epoxy group,
to obtain the compound represented by the formula (4). Each step will be described below in further detail.

Step I
Step I is a step of reacting the primary alcohol represented by the formula (6) with the epoxy group-containing compound represented by the formula (7) to obtain the secondary alcohol compound represented by the following formula (4):

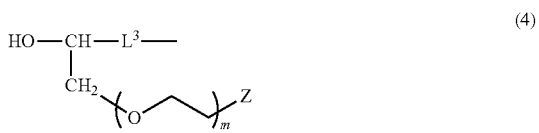
(4)

wherein $L^3$, Z, V, and m are as defined above.

In the formulae (4) and (6), Z is a monovalent organic group which has 1 to 20 carbon atoms in total and has an alkoxy group, a tertiary amino group, a quaternary ammonium group, an amphoteric ion group, or an amide bond, as defined above. The selection of these group is because Z preferably does not have a group reactive with an epoxy group. If Z has a group reactive with an epoxy group, an unfavorable side reaction may occur in the reaction step of the primary alcohol and the compound represented by the formula (7). A group reactive with an epoxy group-containing compound here means, for instance, a carboxyl group, a thiol group, a primary hydroxyl group, a primary amino group, or a secondary amino group. The formula (6) does not have these groups. Examples of the group represented by the formula (6) include 2-methoxyethanol, 2-(2-methoxyethoxy)ethanol, 2-(dimethylamino)ethanol, 1-(2-hydroxyethyl)-2-pyrrolidone, 2-acetamideethanol, and polyoxyethylene monomethylether.

As defined above, m is an integer of from 1 to 100, preferably an integer of from 1 to 20, more preferably an integer of from 1 to 5. When m is larger than the upper limit, reactivity is low in the reaction between the primary alcohol represented by the formula (6) and the epoxy-containing compound represented by the formula (7), so that the primary alcohol may remain or unreacted.

In the formulas (4) and (7), $L^3$ is a divalent hydrocarbon group which has 2 to 10 carbon atoms and a carbon-carbon unsaturated bond at the end, may have at least one of ether bond. $L^3$ is capable of hydrosilylation reaction. $L^3$ is, for example, an alkenyl group having 2 to 10 carbon atoms. Examples of the group having at least one of ether bond may include polyalkylene oxide having an alkenyl group at the end, such as polyethylene oxide, polypropylene oxide, and polyethylene-propylene oxide groups. $L^3$ particularly has a vinyl group, a vinylether group, an allyl group, or a methallyl group at the end. For example, $L^3$ is represented by —CH$_2$OCH$_3$CH=CH$_2$.

In the formula (7), P is a monovalent organic group having 2 to 7 carbon atoms which has an epoxy group. For example, P is a monovalent hydrocarbon group having an epoxy group at the end, such as an epoxy group and 2,3-epoxypropyl group. Examples of the epoxy-containing compound represented by the formula (7) include 1-allyloxy-2,3-epoxypropane and 1,2-epoxy-4-vinylcyclohexane, but is not limited to these.

The reaction between the primary alcohol represented by the formula (6) and the epoxy-containing compound represented by the formula (7) may be conducted according to any conventional known method. For example, the reaction may be conducted by reacting one molar equivalent amount or less of the epoxy group-containing compound, per mole of the primary alcohol compound. The reaction temperature is not particularly limited and is preferably a temperature which does not exceed a boiling point of a solvent used.

For instance, the reaction may be conducted at a temperature of about 0 to 120 degrees C. The reaction may be conducted in the presence of a catalyst in addition to the solution. Any known solvent and catalyst may be used and are not particularly limited.

Examples of the catalysts include a phosphorus-based compound, a tertiary amine, various imidazoles, an organic acid metal salt, a Lewis acid, and an amine complex salt.

Examples of the solvent include glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether, and polyethylene glycol dimethyl ether; ester solvents such as ethyl acetate, butyl acetate, amyl acetate, ethyl lactate, and methyl benzoate; aliphatic hydrocarbon solvents such as linear hexane, linear heptane, and linear octane; alicyclic hydrocarbon solvents such as cyclohexane and ethyl cyclohexane; ketone solvents such as acetone, methyl ethyl ketone, and methyl isobutyl ketone; aromatic hydrocarbon solvents such as benzene, toluene, and xylene; and petroleum solvents. The solvents may be used alone or in a combination of two or more of them.

Step II

Step II is a step of subjecting the terminal carbon-carbon unsaturated group of the secondary alcohol compound represented by the formula (4) and the terminal hydrosilyl group of the linear polysiloxane structure represented by the formula (5) to the hydrosilylation reaction to obtain the OH group-containing compound represented by the following formula (2):

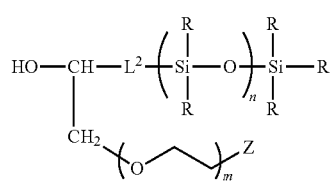

(2)

wherein $L^2$, Z, R, n and m are as defined above.

The reaction may be conducted according to any conventional known method. For example, the reaction may be conducted by reacting one molar equivalent amount or less of the compound represented by the formula (4), per mole of the polysiloxane compound represented by the formula (5). The reaction temperature is not particularly limited and is preferably a temperature which does not exceed a boiling point of a solvent used. For instance, the reaction may be conducted at a temperature of about 0 to 120 degrees C. The reaction may be conducted in the presence of a hydrosilylation catalyst in addition to the solvent. Any known solvent and hydrosilylation catalyst may be used and are not particularly limited.

The hydrosilylation catalyst is, for example, preferably a noble metal catalyst, particularly a platinum catalyst derived from chloroplatinic acid. In particular, it is preferable that chloride ions of the chloroplatinic acid is completely neutralized with sodium bicarbonate so as to improve stability of the platinum catalyst. For example, the hydrosilylation catalyst is more preferably a complex (Karstedt's catalyst) of 1,1,3,3-tetramethyl-1,3-divinyldisiloxane and sodium bicarbonate-neutralized chloroplatinic acid.

The amount of the hydrosilylation catalyst may be a catalyst amount so as to progress the reaction. For example, the complex of 1,1,3,3-tetramethyl-1,3-divinyldisiloxane and sodium bicarbonate-neutralized chloroplatinic acid may be added in an amount such that the amount of platinum is 5 to 80 ppm by mass, relative to the amount of the polysiloxane compound.

Examples of the solvent include glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether, and polyethylene glycol dimethyl ether; ester solvents such as ethyl acetate, butyl acetate, amyl acetate, ethyl lactate, and methyl benzoate; aliphatic hydrocarbon solvents such as linear hexane, linear heptane, and linear octane; alicyclic hydrocarbon-based solvents such as cyclohexane and ethyl cyclohexane; ketone solvents such as acetone, methyl ethyl ketone, and methyl isobutyl ketone; aromatic hydrocarbon solvents such as benzene, toluene, and xylene; petroleum solvents; and alcohol solvents such as methyl alcohol, ethyl alcohol, linear propyl alcohol, isopropyl alcohol, linear butyl alcohol, isobutyl alcohol, tert-butyl alcohol, ethylene glycol, diethylene glycol, triethylene glycol, tetraethylene glycol, and polyethylene glycol. The solvents may be used alone or in a combination of two or more of them.

Step III

Step III is a step of reacting the OH group-containing polysiloxane compound represented by the formula (2) with (meth)acryl group-containing compound represented by the formula (3) to obtain the compound represented by the following formula (1):

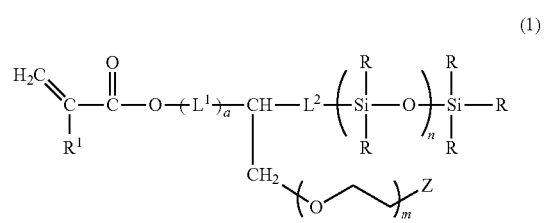

(1)

wherein $L^1$, $L^2$, Z, R, $R^1$, a, n, and m are as defined above.

The (meth)acryl group-containing compound represented by the formula (3) has a group reactive with secondary alcohol. Examples of the group reactive with secondary alcohol include an alkyl halide group, an acyl halide group, and an isocyanato group. This group is represented by -$(L^1)_a$X in the formula (3), wherein X is a halogen atom or an isocyanato group, $L^1$ is as defined above, and a is 0 or 1. Examples of the (meth)acryl group-containing compound represented by the formula (3) include 2-isocyanatoethyl methacrylate, 2-isocyanatoethyl acrylate, methacryloyl chloride, and acryloyl chloride, but not limited to these.

The reaction may be conducted according to any conventional known method. For example, the reaction may be conducted by reacting one molar equivalent amount or less of the (meth)acryl group-containing compound represented by the formula (3), per mole of the OH group-containing polysiloxane compound represented by the formula (2). The reaction temperature is not particularly limited and is preferably a temperature which does not exceed a boiling point of a solvent used. For instance, the reaction may be conducted at a temperature of about 0 to 80 degrees C. The reaction may be conducted in the presence of a catalyst in addition to the solution. Any known solvent and catalyst may be used and are not particularly limited. Any of the solvents described above can be used.

Examples of the catalyst include an organic metal catalyst and an amine catalyst. Examples of the organic metal catalyst, but not particularly limited, include organic tin catalysts such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate; and acetylacetone metal salts such as acetylacetone aluminium, acetylacetone iron, acetylacetone copper, acetylacetone zinc, acetylacetone beryllium, acetylacetone chromium, acetylacetone indium, acetylacetone manganese, acetylacetone molybdenum, acetylacetone titanium, acetylacetone cobalt, acetylacetone vanadium, and acetylacetone zirconium. Examples of the amine catalyst include pentamethyldiethylenetriamine, triethylamine, N-methylmorpholine bis(2-dimethylaminoethyl)ether, N,N,N',N'',N''-pentamethyldiethylenetriamine, N,N,N'-trimethylaminoethyl-ethanol amine, bis(2-dimethylaminoethyl)ether, N-methyl-N',N'-dimethylamino ethyl piperazine, N,N-dimethylcyclohexylamine, diazabicyclo undecene, triethylene diamine, tetramethyl hexamethylene diamine, N-methylimidazole, trimethylaminoethyl piperazine, tripropylamine, a tetramethyl ammonium salt, and a tetraethyl ammonium salt, and a triphenyl ammonium salt.

Step IV

The compound obtained by the above-described method, which is represented by the formula (1) and has a tertiary amino group at the end (Z), is further subjected to a reaction with a sultone compound or a halogenated alkyl compound such as 1,3-propanesultone, 1,4-butanesultone, 1-bromobutane, to obtain a compound having Z which has an ion group represented by the following formula (a), (b), or (e).

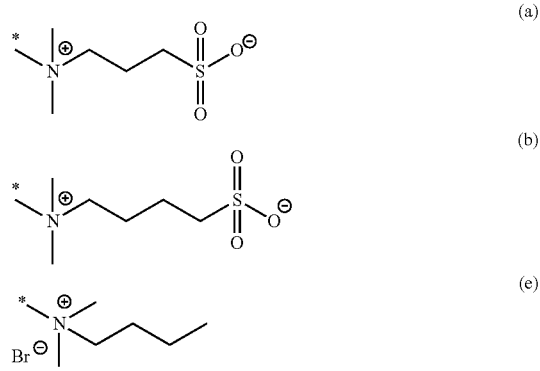

The reaction may be conducted according to any conventional known method. For example, the reaction may be conducted by reacting one molar equivalent amount or less of the sultone compound or the halogenated alkyl compound, per mole of the compound represented by the formula (1) having the tertiary amino group at the end (Z). The reaction temperature is not particularly limited and is preferably a temperature which does not exceed a boiling point of a solvent used. For instance, the reaction may be conducted at a temperature of about 0 to 80 degrees C. The reaction may be conducted in the presence of and a catalyst in addition to the solvent. Any known solvent and catalyst may be used and are not particularly limited. Any of the solvents described above can be used.

In any of the aforementioned reactions, the completion of the reaction can be determined by confirming the disappearance of peaks of the starting compounds according to a conventional method, for instance, using thin-layer chromatography (TCL), high performance liquid chromatography (HPLC), or gas chromatography (GC). After the completion of the reaction, the obtained product may be purified by the conventional method. For example, the obtained product is isolated by washing the organic layer with water and then removing the solvent. Distillation at a reduced pressure and an active carbon treatment may also be used.

As an example of the preparation method, one molar equivalent of the primary alcohol compound represented by the formula (6), one molar equivalent of the epoxy-containing compound represented by the formula (7), and 0.05 molar equivalent of triethylamine are added to a reactor, and heated with stirring at 100 degrees C. The reaction completes in about 10 hours. The progress of the reaction can be followed by monitoring the primary alcohol compound or the epoxy-containing compound by GC or the like. After the completion of the reaction, one mass equivalent of toluene is added, and an organic phase is washed with water and subjected to distillation to remove the solvent off and the unreacted starting materials remaining in the organic phase at a reduced pressure. Thus, the secondary alcohol compound represented by the formula (4) is obtained.

Subsequently, one molar equivalent of the secondary alcohol compound represented by the formula (4), one molar equivalent of the polysiloxane compound represented by the formula (5), a solution of a complex of a sodium bicarbonate-neutralized chloroplatinic acid and vinylsiloxane in toluene (containing 0.5 wt % of platinum) in an amount of 10 ppm of platinum relative to the mass of the polysiloxane compound, and one mass equivalent of toluene are added, heated with stirring at 100 degrees C. The reaction completes in about two hours. The progress of the reaction can be followed by monitoring the polysiloxane compound and the secondary alcohol compound having a hydrophilic group in a side chain by GC or the like. After the completion of the reaction, the solvent and the unreacted starting materials are distilled off at a reduced pressure to obtain the OH group-containing polysiloxane compound represented by the following formula (2).

Subsequently, one molar equivalent of the OH group-containing polysiloxane compound represented by the formula (2), one molar equivalent of triethylamine, one mass equivalent of toluene are added to a reactor and, then, one molar equivalent of the methacryloyl chloride represented by the formula (3) is added, followed by stirring at room temperature. Then, the reaction completes in about 10 hours. The progress of the reaction can be followed by monitoring the methacryloyl chloride by GC or the like. After the completion of the reaction, an organic phase is washed with water, and the solvent and the unreacted raw materials remaining in the organic phase are distilled off at a reduced pressure. Thus, the polysiloxane monomer compound according to the present invention, represented by the formula (1), is obtained.

The compound according to the present invention can provide a polymer having a repeating unit derived from the addition polymerization at a (meth)acrylic group. The compound according to the present invention is well compatible with other compounds having a polymerizable group such as a (meth)acrylic group, hereinafter referred to as a polymerizable monomer or a hydrophilic monomer. Therefore, the compound according to the present invention is copolymerizable with the polymerizable monomer to provide a colorless and transparent copolymer. Moreover, the compound according to the present invention can be polymerized alone.

In the preparation of the copolymer having the repeating unit derived from polymerization of the present silicone compound and the other polymerizable (hydrophilic) monomer, the proportion of the present silicone compound to be added may be such that the mass proportion of the repeating unit derived from the present silicone compound is 10% or more, relative to the total mass of the copolymer. Specifically, the amount of the present compound is preferably 10 to 80 parts by mass, more preferably 20 to 60 parts by mass, relative to the total 100 parts by mass of the present compound and the polymerizable (hydrophilic) monomer.

Examples of the polymerizable monomer include acrylic monomers such as (meth)acrylic acid, methyl(meth)acrylate, ethyl(meth)acrylate, (poly)ethylene glycol dimethacrylate, polyalkylene glycol mono(meth)acrylate, polyalkylene glycol monoalkylether(meth)acrylate, trifluoroethyl(meth)acrylate, 2-hydroxyethyl(meth)acrylate, and 2,3-dihydroxypropyl(meth)acrylate; acrylic acid derivatives such as N,N-dimethylacrylamide, N,N-diethylacrylamide, N-acryloylmorpholine, and N-methyl(meth)acrylamide; N-vinylpyrrolidone, other unsaturated aliphatic compounds or aromatic compounds such as crotonic acid, cinnamic acid, and vinylbenoic acid; and a silicone monomer having a polymerizable group such as a (meth)acryl group. These polymerizable monomers may be used alone or in a combination of two or more of them.

The copolymerization of the present compound and, if any, the other polymerizable monomer may be conducted according to a conventional method. For example, the copolymerization can be conducted using a known polymerization initiator such as a thermal polymerization initiator or a photopolymerization initiator. Examples of the polymerization initiator include 2-hydroxy-2-methyl-1-phenyl-propane-1-one, azobisisobutyronitrile, azobis dimethylvaleronitrile, benzoyl peroxide, tert-butyl hydroperoxide, and cumene hydroperoxide. These polymerization initiators may be used alone or in a combination of two or more of them. The amount of the polymerization initiator is 0.001 to 2 parts by mass, preferably 0.01 to 1 parts by mass, relative to 100 parts by mass of the total amount of the polymerizable starting materials.

The polymer having the repeating unit derived from the present compound has excellent oxygen permeability and low elastic modulus. Hydrogel obtained from the polymer has excellent surface wettability. Therefore, the present compound is suitable for the production of ophthalmic devices such as contact lenses, intraocular lenses, and artificial corneas. A method for preparing the ophthalmic device using the polymer is not particularly limited and may be according to any conventional one. For example, a cutting means or a template (molding) may be used for forming lenses such as contact lenses and intraocular lenses.

EXAMPLES

The present invention will be explained below in further detail with reference to a series of the Examples and the Comparative Examples, though the present invention is in no way limited by these Examples.

In the following Examples, $^1$H-NMR analysis was performed using ECS500 manufactured by JEOL and deuterated chloroform as a solvent for measurement.

Example 1

[Step I]

To a 1 L-three-necked flask equipped with a dimroth condenser, a thermometer, and a dropping funnel, were added 112.0 g of allyl glycidyl ether, 56.0 g of 2-methoxyethanol, and 1.0 g of triethylamine, and the mixture was then stirred at 100 degrees C. for 10 hours. When the peak of allyl glycidyl ether disappeared in gas chromatography (GC), it was construed that the reaction completed. After the completion of the reaction, unreacted raw materials were distilled off at an inner temperature of 100 degrees C. and a reduced pressure, followed by distillation to obtain 100.6 g of a colorless transparent liquid. $^1$H-NMR analysis showed that the obtained one was a compound represented by the following formula (8A).

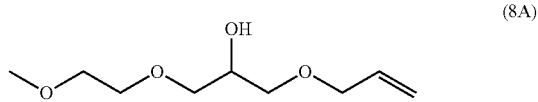

(8A)

[Step II]

To a 1 L-three-necked flask equipped with a dimroth condenser, a thermometer, and a dropping funnel, were added 220.0 g of the compound obtained in the step I and represented by the formula (8A), 400.0 g of a siloxane compound represented by the following formula (9A), and 220.0 g of toluene were added, and the mixture was then heated to 80 degrees C. To this mixture, was added 0.06 g of a solution of a complex of sodium bicarbonate-neutralized chloroplatinic acid and vinylsiloxane in toluene (containing 0.5 wt % of platinum), and the mixture was then aged at at least 80 degrees C. for four hours. After the aging, disappearance of the peak of the SiH group of the siloxane was confirmed by $^1$H-NMR. The solution after the reaction was washed with deionized water five times to remove the remaining compound represented by the formula (8A), and the solvent was thereafter distilled off at an inner temperature of 80 degrees C. and a reduced pressure to obtain 576.8 g of a colorless transparent liquid. $^1$H-NMR analysis showed that the obtained one was a compound represented by the following formula (10A).

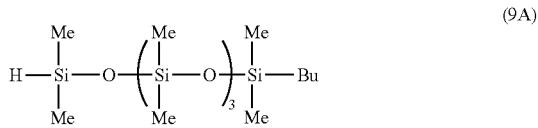

(9A)

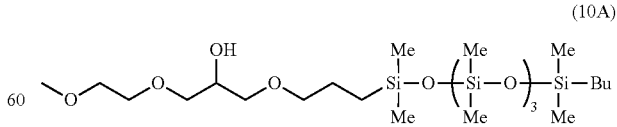

(10A)

[Step III]

To a 1 L-three-necked flask equipped with a dimroth condenser, a thermometer, and a dropping funnel, were added 100.0 g of the compound represented by the formula (10A), 20.1 g of triethylamine, and 200.0 g of dichloromethane, and the mixture was then cooled to 10 degrees C. To this mixture, 20.8 g of methacryloyl chloride was added dropwise, and the mixture was then aged at 20 degrees C. for four hours. The mixture after the reaction was washed with deionized water three times to remove a by-producted salt, and the solvent and the by-product were distilled off at an inner temperature of 80 degrees C. and a reduced pressure to obtain 97.3 g of a colorless transparent liquid. $^1$H-NMR analysis showed that the obtained one was a compound represented by the following formula (11A).

(11A)

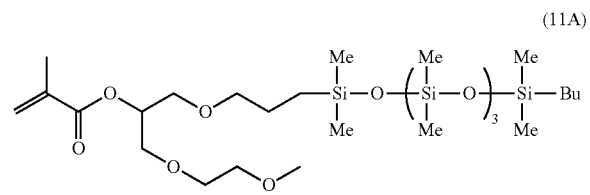

$^1$H-NMR data are as follows:
0.0 ppm (30H), 0.4 ppm (4H), 0.9 ppm (3H), 1.3 ppm (4H), 1.5 ppm (2H), 2.1 ppm (3H), 3.4-3.7 ppm (13H), 4.9 ppm (1H), 5.7 ppm (1H), 6.2 ppm (1H)

Example 2

[Step I]
The step I of Example 1 was repeated, except that 2-methoxyethanol was replaced with 2-(2-methoxyethoxy)ethanol, to obtain a colorless transparent liquid. The yield was 105.1 g. $^1$H-NMR analysis showed that the obtained one was a compound represented by the following formula (8B).

(8B)

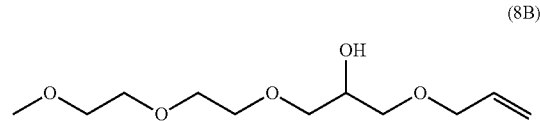 [SMILES: C=CCOCC(O)COCCOCCOC]

[Step II]
The step II of Example 1 was repeated, except that the compound represented by the formula (8A) was replaced with the compound represented by the formula (8B), to obtain a colorless transparent liquid. The yield was 590.0 g. $^1$H-NMR analysis showed that the obtained one was a compound represented by the following formula (10B).

(10B)

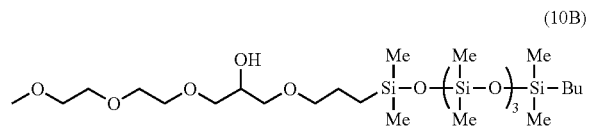

Example 3

[Step I]
The step I of Example 1 was repeated, except that 2-methoxyethanol was replaced with 2-[2-(2-methoxyethoxy)ethoxy]ethanol, to obtain a colorless transparent liquid. The yield was 114.2 g. $^1$H-NMR analysis showed that the obtained one was a compound represented by the following formula (8C).

(8C)

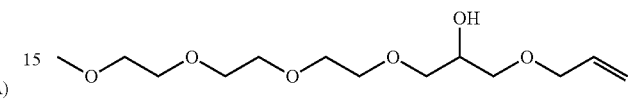

[Step II]
The step II of Example 1 was repeated, except that the compound represented by the formula (8A) was replaced with the compound represented by the formula (8C), to obtain a colorless transparent liquid. The yield was 601.3 g. $^1$H-NMR analysis showed that the obtained one was a compound represented by the following formula (10C).

(10C)

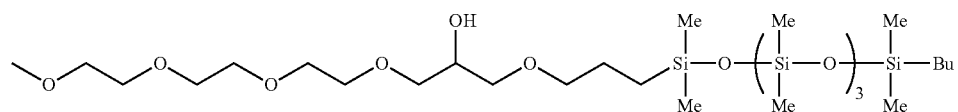

[Step III]
The step III of Example 1 was repeated, except that the compound represented by the formula (10A) was replaced with the compound represented by the formula (10C), to obtain a colorless transparent liquid. The yield was 94.2 g. $^1$H-NMR analysis showed that the obtained one was a compound represented by the following formula (11C).

(11C)

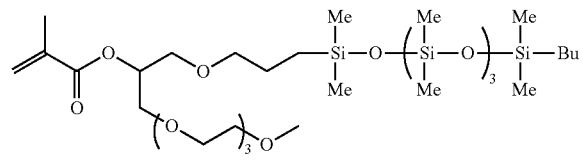

$^1$H-NMR data are as follows:
0.0 ppm (30H), 0.4 ppm (4H), 0.9 ppm (3H), 1.3 ppm (4H), 1.5 ppm (2H), 2.1 ppm (3H), 3.4-3.7 ppm (21H), 4.9 ppm (1H), 5.7 ppm (1H), 6.2 ppm (1H)

Example 4

[Step I]
The step I of Example 1 was repeated, except that 2-methoxyethanol was replaced with 2-(dimethylamino)ethanol, to obtain a colorless transparent liquid. The yield was 103.0 g. $^1$H-NMR analysis showed that the obtained one was a compound represented by the following formula (8D).

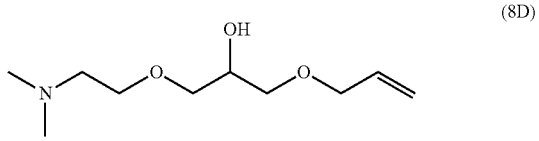
(8D)

[Step II]

The step II of Example 1 was repeated, except that the compound represented by the formula (8A) was replaced with the compound represented by the formula (8D), to obtain a colorless transparent liquid. The yield was 580.7 g. ¹H-NMR analysis showed that the obtained one was a compound represented by the following formula (10D).

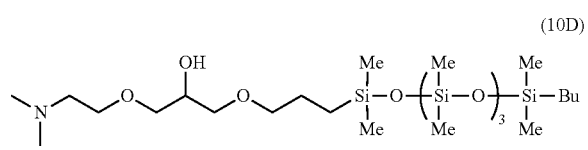
(10D)

[Step III]

The step III of Example 1 was repeated, except that the compound represented by the formula (10A) was replaced with the compound represented by the formula (10D), to obtain a colorless transparent liquid. The yield was 100.8 g. ¹H-NMR analysis showed that the obtained one was a compound represented by the following formula (11D).

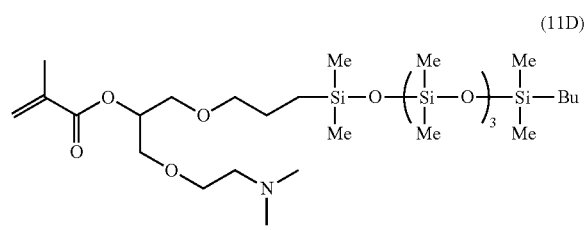
(11D)

¹H-NMR data are as follows:
0.0 ppm (30H), 0.4 ppm (4H), 0.9 ppm (3H), 1.3 ppm (4H), 1.5 ppm (2H), 2.1 ppm (3H), 2.3 ppm (6H), 2.4 ppm (2H), 3.4-3.7 ppm (8H), 4.9 ppm (1H), 5.7 ppm (1H), 6.2 ppm (1H)

Example 5

[Step I]

The step I of Example 1 was repeated, except that 2-methoxyethanol was replaced with 2-acetamideethanol, to obtain a colorless transparent liquid. The yield was 106.1 g. ¹H-NMR analysis showed that the obtained compound was represented by the following formula (8E).

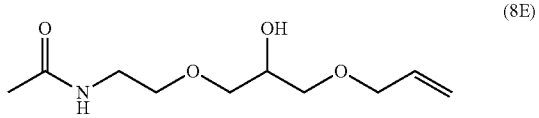
(8E)

[Step II]

The step II of Example 1 was repeated, except that the compound represented by the formula (8A) was replaced with the compound represented by the formula (8E), to obtain a colorless transparent liquid. The yield was 589.1 g. ¹H-NMR analysis showed that the obtained was a compound represented by the following formula (10E).

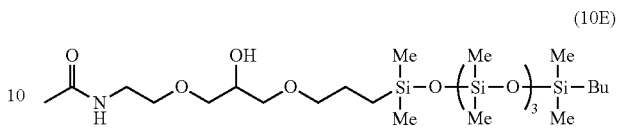
(10E)

[Step III]

The step III of Example 1 was repeated, except that the compound represented by the formula (10A) was replaced with the compound represented by the formula (10E), to obtain a colorless transparent liquid. The yield was 103.1 g. ¹H-NMR analysis showed that the obtained was a compound represented by the following formula (11E).

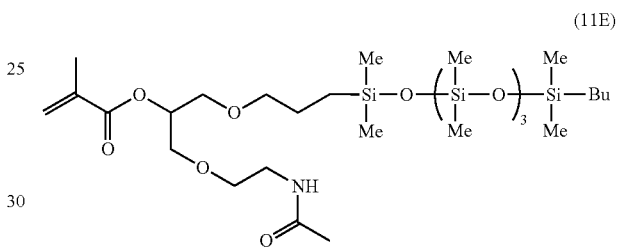
(11E)

¹H-NMR data are as follows:
0.0 ppm (30H), 0.4 ppm (4H), 0.9 ppm (3H), 1.3 ppm (4H), 1.5 ppm (2H), 2.0 ppm (3H), 2.1 ppm (3H), 3.2 ppm (2H), 3.4-3.7 ppm (8H), 4.9 ppm (1H), 5.7 ppm (1H), 6.2 ppm (1H), 7.3 ppm (1H)

Example 6

[Step I]

The step I of Example 1 was repeated, except that 2-methoxyethanol was replaced with 1-(2-hydroxyethyl)-2-pyrrolidone, to obtain a colorless transparent liquid. The yield was 106.3 g. ¹H-NMR analysis showed that the obtained was a compound represented by the following formula (8F).

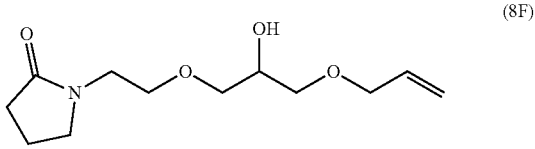 [SMILES: C=CCOCC(O)COCCN1CCCC1=O]
(8F)

[Step II]

The step II of Example 1 was repeated, except that the compound represented by the formula (8A) was replaced with the compound represented by the formula (8F), to obtain a colorless transparent liquid. The yield was 577.0 g. ¹H-NMR analysis showed that the obtained one was a compound represented by the following formula (10F).

(10F)

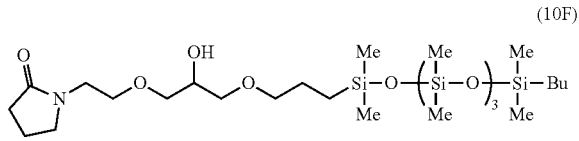

(10G)

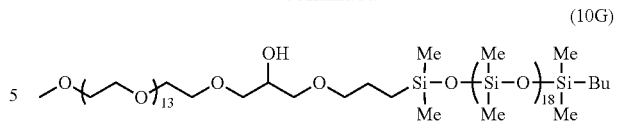

[Step III]

The step III of Example 1 was repeated, except that the compound represented by the formula (10A) was replaced with the compound represented by the formula (10F), to obtain a colorless transparent liquid. The yield was 103.0 g. $^1$H-NMR analysis showed that the obtained one was a compound represented by the following formula (11F).

[Step III]

The step III of Example 1 was repeated, except that the compound represented by the formula (10A) was replaced with the compound represented by the formula (10G), to obtain a colorless transparent liquid. The yield was 105.6 g. $^1$H-NMR analysis showed that the obtained one was a compound represented by the following formula (11G).

(11F)

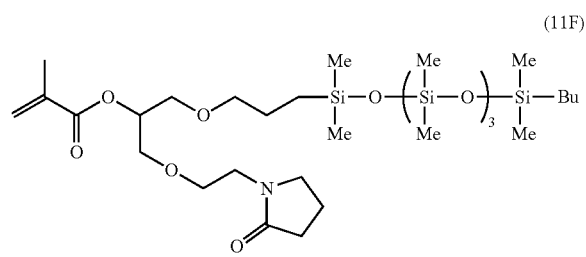

(11G)

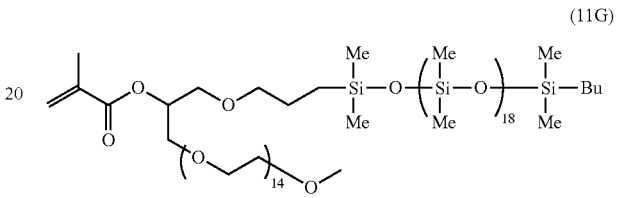

$^1$H-NMR data are as follows:
0.0 ppm (30H), 0.4 ppm (4H), 0.9 ppm (3H), 1.3 ppm (4H), 1.5 ppm (2H), 1.9 ppm (2H), 2.1 ppm (3H), 2.3 ppm (2H), 3.3 ppm (2H), 3.4-3.7 ppm (10H), 4.9 ppm (1H), 5.7 ppm (1H), 6.2 ppm (1H)

$^1$H-NMR data are as follows:
0.0 ppm (120H), 0.4 ppm (4H), 0.9 ppm (3H), 1.3 ppm (4H), 1.5 ppm (2H), 2.1 ppm (3H), 3.4-3.7 ppm (65H), 4.9 ppm (1H), 5.7 ppm (1H), 6.2 ppm (1H)

Example 7

[Step I]

The step I of Example 1 was repeated, except that 2-methoxyethanol was replaced with polyoxyethylene monomethyl ether having an average molecular weight of 550, to obtain a colorless transparent liquid. The yield was 150.3 g. $^1$H-NMR analysis showed that the obtained one was a compound represented by the following formula (8G).

Example 8

To a 1 L-three-necked flask equipped with a dimroth condenser, a thermometer, and a dropping funnel, were added 20.0 g of the compound obtained in Example 4 and represented by the following formula (11D):

(11D)

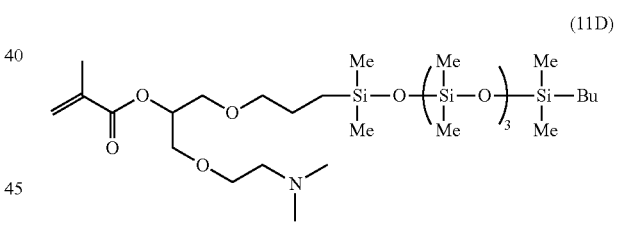

(8G)

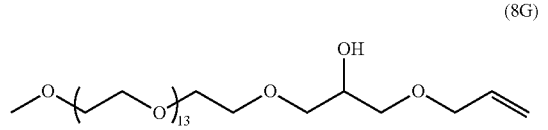

[Step II]

The step II of Example 1 was repeated, except that the compound represented by the formula (8A) was replaced with the compound represented by the formula (8G) and the siloxane represented by the formula (9A) was replaced with the siloxane represented by the following formula (9C), to obtain a colorless transparent liquid. The yield was 453.1 g. $^1$H-NMR analysis showed that the obtained one was a compound represented by the following formula (10G).

and 7.3 g of 1,3-propanesultone, and the mixture was then aged at 80 degrees C. for four hours. Then, the mixture was subjected to distillation at an inner temperature of 80 degrees C. and a reduced pressure to obtain a colorless transparent liquid in a distillation still. The yield was 24.8 g. $^1$H-NMR analysis showed that the obtained one was a compound represented by the following formula (12D).

(12D)

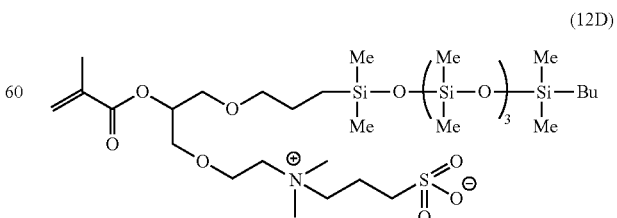

(9C)

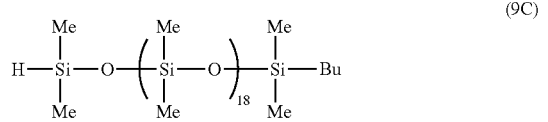

¹H-NMR data are as follows:
0.0 ppm (30H), 0.4 ppm (4H), 0.9 ppm (3H), 1.3 ppm (4H), 1.5 ppm (2H), 2.1 ppm (3H), 2.3 ppm (2H), 2.9 ppm (2H), 3.2 ppm (6H), 3.4-3.7 ppm (12H), 4.9 ppm (1H), 5.7 ppm (1H), 6.2 ppm (1H)

Example 9

The procedures of Example 8 were repeated, except that 1,3-propanesultone was replaced with 1,4-butanesultone, to obtain a colorless transparent liquid. The yield was 24.3 g.
¹H-NMR analysis showed that the obtained one was a compound represented by the following formula (13D).

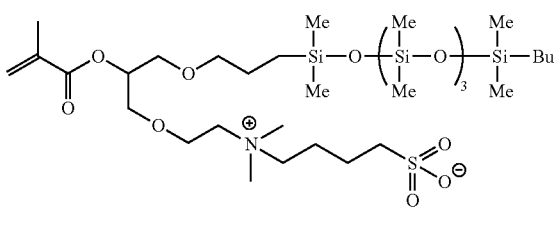
(13D)

¹H-NMR data are as follows:
0.0 ppm (30H), 0.4 ppm (4H), 0.9 ppm (3H), 1.3 ppm (4H), 1.5 ppm (2H), 1.9-2.1 ppm (7H), 2.9 ppm (2H), 3.2 ppm (6H), 3.3-3.7 ppm (12H), 4.9 ppm (1H), 5.7 ppm (1H), 6.2 ppm (1H)

Example 10

The procedures of Example 8 were repeated, except that 1,3-propanesultone was replaced with 1-bromobutane, to obtain a colorless transparent liquid. The yield was 23.5 g.
¹H-NMR analysis showed that the obtained one was a compound represented by the following formula (14D).

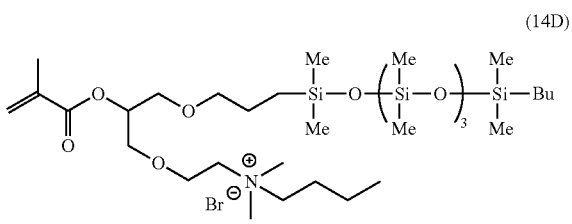
(14D)

¹H-NMR data are as follows:
0.0 ppm (30H), 0.4 ppm (4H), 0.9 ppm (3H), 1.0 ppm (3H), 1.3 ppm (6H), 1.5 ppm (2H), 1.7 ppm (2H), 2.1 ppm (3H), 3.1 ppm (6H), 3.2 ppm (2H), 3.4-3.7 ppm (10H), 4.9 ppm (1H), 5.7 ppm (1H), 6.2 ppm (1H)

Preparation of Compounds for Comparative Examples

The step II of Example 3 was repeated, except that the siloxane was replaced with tris(trimethylsilyloxy)silane, to obtain a colorless transparent liquid. The yield was 389.5 g.
¹H-NMR analysis showed that the obtained one was a compound represented by the following formula (10H).

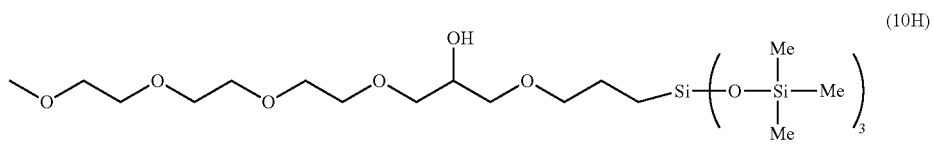
(10H)

The step III of Example 1 was repeated, except that the compound represented by the formula (10A) was replaced with the compound represented by the formula (10H), to obtain a colorless transparent liquid. The yield was 90.3 g.
¹H-NMR analysis showed that the obtained one was a compound represented by the following formula (11H).

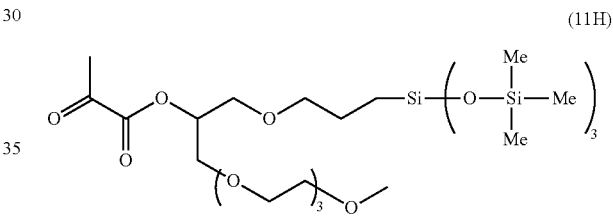
(11H)

¹H-NMR data are as follows:
0.0 ppm (27H), 0.4 ppm (2H), 1.5 ppm (2H), 2.1 ppm (3H), 3.4-3.7 ppm (21H), 4.9 ppm (1H), 5.7 ppm (1H), 6.2 ppm (1H)

[Preparation of Polymers]

Each of the compounds obtained in the Examples, N-vinylpyrrolidone (NVP), ethylene glycol dimethacrylate (EGDMA), and IRGACURE 1173 (Irg 1173) were mixed in the amounts shown in Table 1 and stirred until a uniform solution was obtained. After the stirring, $N_2$ was bloom into the solution for five minutes. The solution was sufficiently deaerated, and poured in a polypropylene mold. The solution was irradiated by UV with a high pressure mercury lamp to cause curing. The cured product was soaked in isopropanol, a 50% isopropanol aqueous solution, and then deionized water for washing, so that a hydrogel film was obtained. The properties of the obtained hydrogel film were determined according to the following methods. The results are as shown in Table 1.

[Equilibrium Water Content]

Each of the films was soaked in deionized water at 25 degrees C. for 48 hours and, then, water on the surface of the film was wiped away. Thus, the hydrated film was formed. The hydrated film was weighed. Subsequently, the hydrated film was dried at 50 degrees C. for 48 hours and further at 25 degrees C. for 24 hours in an oven, and the mass of the dried film was weighed. The equilibrium water content was calculated according to the following equation.

Equilibrium water content (%)=100×(mass of the hydrated film−mass of the dried film)/mass of the hydrated film

[Elastic Modulus]

Each of the films was soaked in deionized water at 25 degrees C. for 48 hours and, then, water on the surface of the film was wiped away. The hydrated film was formed. The Young's modulus of the hydrated film was determined with INSTRON 5943. Specifically, the film was cut into a size of 0.8 cm×4.0 cm. The cut film was elongated with a load cell of 50N at a head speed of 1 cm/min. A stress-strain curve was obtained with the stress on a vertical axis and the strain on a horizontal axis. An initial slope (in a straight-line segment) was calculated, which is the Young's modulus (MPa).

[Compatibility with a Hydrophilic Monomer]

Compatibility with a hydrophilic monomer, N-vinylpyrrolidone (NVP) widely used in the production of ophthalmic devices was evaluated. Specifically, equal masses of the silicone compound and NVP were mixed, and stirred at 25 degrees C. for 10 minutes. After the stirring, the mixture was left still at 25 degrees C. for five hours, and the appearance of the mixture was then observed visually and evaluated according to the following criteria.

A: uniform and transparent
B: clouded
C: the silicone compound and NVP separated completely.

[Contact Angle]

The contact angle (°) of each of the hydrated films obtained above with water was determined by a sessile drop method using a contact angle meter CA-D (ex. Kyowa Interface Science Co. Ltd.).

Comparative Examples 1 to 4

Compounds used in Comparative Examples 1 to 3 in Table 1 are as follows.

SiGMA: 2-methyl-2-hydroxy-3-[3-[1,3,3,3-tetramethyl-1-[(trimethylsilyl)oxy]disiloxanyl]propoxy]propylacrylate mPDMS: polydimethylsiloxane having a monornethacryloxypropyl radical at one end and a monobutyl group at the other end and having a molecular weight of 800 to 1000.

TRIS-PEG2: 2-methyl-2-[2-[3-[3,3,3-trimethyl-1,1-bis[(trimethylsilyl)oxy]-1-disiloxanyl]propoxy]ethoxy]ethyl acrylate Hydrogel films were formed as mentioned above except that the compound of the Example was replaced with the aforesaid compounds for the Comparative Examples and compound 11H. The properties of the hydrogel films were determined similarly to the described method. The results are as shown in Table 1.

|  |  | Ex.1 | Ex.3 | Ex.4 | Ex.5 | Ex.6 | Ex.7 | Ex.8 | Com. Ex.1 | Com. Ex.2 | Com. Ex.3 | Com. Ex.4 |
|---|---|---|---|---|---|---|---|---|---|---|---|---|
| Siloxane monomer | 11A | 50 | — | — | — | — | — | — | — | — | — | — |
|  | 11C | — | 50 | — | — | — | — | — | — | — | — | — |
|  | 11D | — | — | 50 | — | — | — | — | — | — | — | — |
|  | 11E | — | — | — | 50 | — | — | — | — | — | — | — |
|  | 11F | — | — | — | — | 50 | — | — | — | — | — | — |
|  | 11G | — | — | — | — | — | 50 | — | — | — | — | — |
|  | 12D | — | — | — | — | — | — | 50 | — | — | — | — |
| Comparative compound | SIGMA | — | — | — | — | — | — | — | 50 | — | — | — |
|  | mPDMS | — | — | — | — | — | — | — | — | 50 | — | — |
|  | TRIS-PEG2 | — | — | — | — | — | — | — | — | — | 50 | — |
|  | 11H | — | — | — | — | — | — | — | — | — | — | 50 |
| Polymerizable monomer | NVP | 50 | 50 | 50 | 50 | 50 | 50 | 50 | 50 | 50 | 50 | 50 |
|  | EGDMA | 0.5 | 0.5 | 0.5 | 0.5 | 0.5 | 0.5 | 0.5 | 0.5 | 0.5 | 0.5 | 0.5 |
|  | Irg1173 | 0.04 | 0.04 | 0.04 | 0.04 | 0.04 | 0.04 | 0.04 | 0.04 | 0.04 | 0.04 | 0.04 |
| Evaluation | Equilibrium water content, % | 44.7 | 45.4 | 46 | 45.1 | 45.5 | 45.1 | 53.6 | 46.8 | 43.1 | 44.9 | 45.8 |
|  | Elastic Modulus, MPa | 0.56 | 0.6 | 0.58 | 0.62 | 0.64 | 0.46 | 0.87 | 1.21 | 0.46 | 0.45 | 0.68 |
|  | Compatibility with NVP*[1] | A | A | A | A | A | A | A | A | C | B | B |
|  | Contact angle (°) | 64 | 55 | 52 | 56 | 53 | 56 | 41 | 90 | 104 | 95 | 88 |

As shown in Table 1, the compound according to the present invention has excellent compatibility with a hydrophilic monomer, and the hydrogel obtained by copolymerizing the present compound and a hydrophilic monomer has a low modulus of elasticity and excellent surface wettability.

INDUSTRIAL APPLICABILITY

The compound according to the present invention attains an improved surface wettability of an obtained hydrogel. The present compound is useful as a monomer for preparing ophthalmic devices such as a contact lens, an intraocular lens, an artificial cornea, and a lens for eyewears.

The invention claimed is:
1. A compound represented by the following formula (1):

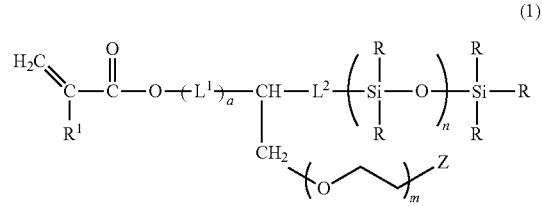

(1)

wherein $R^1$ is a hydrogen atom or a methyl group, $L^1$ is a divalent hydrocarbon group which has 1 to 6 carbon atoms and may have at least one bond selected from an ether bond, an ester bond, and an urethane bond, or two or more of these bonds, a is 0 or 1, $L^2$ is a divalent hydrocarbon group which has 2 to 10 carbon atoms and may have at least one of ether bond, Z is a monovalent organic group which has 1 to 20 carbon atoms in total and has an amide bond, an alkoxy group, a tertiary amino group, a quaternary ammonium group or an amphoteric ion group, m is an integer of from 1 to 100, n is an integer of from 1 to 100, and R is, independently of each other, a monovalent hydrocarbon group having 1 to 10 carbon atoms.

2. The compound according to claim 1, wherein n is an integer of from 2 to 20.

3. The compound according to claim 1 or 2, wherein $L^2$ is —$CH_2OC_3H_6$—.

4. The compound according to claim 1, wherein R is an alkyl group having 1 to 6 carbon atoms or a phenyl group.

5. The compound according to claim 1, wherein Z is a monovalent organic group which has 1 to 10 carbon atoms and has an amide bond, an alkoxy group, a dimethylamino group, an alkyl dimethyl ammonium group or a sulfobetaine group.

6. The compound according to claim 5, wherein Z is selected from the groups consisting of a methoxy group, an ethoxy group, a dimethylamino group, a methyl dimethyl ammonium group, an ethyl dimethyl ammonium group, a propyl dimethyl ammonium group, a butyl dimethyl ammonium group, and a group represented by any one of the following formulas (a) to (d)

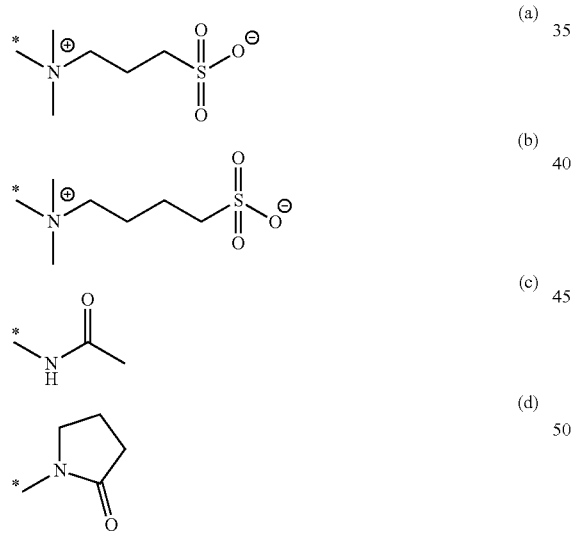

wherein the site marked with * is to bond to the carbon atom.

7. The compound according to claim 1, wherein m is an integer of from 1 to 20.

8. A polymer comprising repeating units derived from a polymerization at the (meth)acryl group of the compound according to claim 1.

9. The polymer according to claim 8, wherein an amount of the repeating units is 10 mass % or more, relative to a total mass of the polymer.

10. A silicone hydrogel comprising the polymer according to claim 8 or 9.

11. An ophthalmic device comprising the polymer according to claim 8 or 9.

12. A method for preparing a compound represented by the following formula (1):

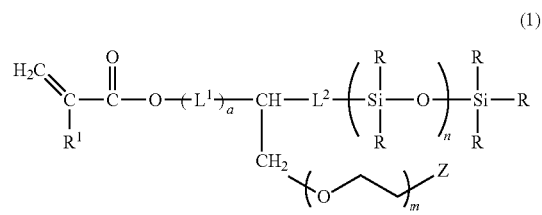

wherein $R^1$ is a hydrogen atom or a methyl group, $L^1$ is a divalent hydrocarbon group which has 1 to 6 carbon atoms and may have at least one bond selected from an ether bond, an ester bond, and an urethane bond, or two or more of these bonds, a is 0 or 1, $L^2$ is a divalent hydrocarbon group which has 2 to 10 carbon atoms and may have at least one of an ether bond, Z is a monovalent organic group which has 1 to 20 carbon atoms in total and has an amide bond, an alkoxy group, a tertiary amino group, a quaternary ammonium group or an amphoteric ion group, m is an integer of from 1 to 100, n is an integer of from 1 to 100, and R is, independently of each other, a monovalent hydrocarbon group having 1 to 10 carbon atoms, comprising a step of reacting an OH group-containing polysiloxane compound represented by the following formula (2):

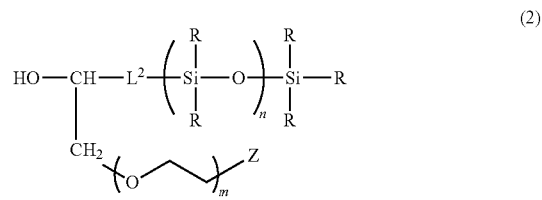

wherein $L^2$, Z, R, n and m are as defined above, with a (meth)acryl group-containing compound represented by the formula (3):

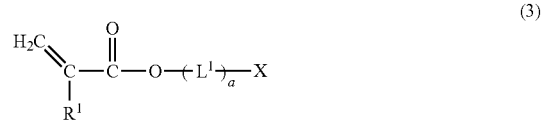

wherein $L^1$, $R^1$, and a are as defined above, and X is a halogen atom or an isocyanato group, provided that when a is 0, X is a halogen atom, to obtain the compound represented by the formula (1).

13. The method according to claim 12, further comprising a step of reacting a secondary alcohol compound represented by the following formula (4):

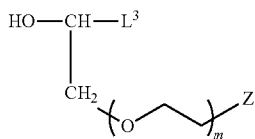

(4)

wherein $L^3$ is a monovalent hydrocarbon group which has 2 to 10 carbon atoms and a carbon-carbon unsaturated bond at an end and may have at least one of ether bond, and Z and m are as defined above,
with a polysiloxane compound represented by the following formula (5):

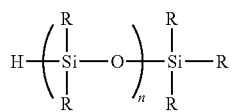

(5)

wherein R and n are as defined above,
to and the OH group-containing polysiloxane compound represented by the formula (2).

14. The method according to claim 13, further comprising a step of reacting a primary alcohol compound represented by the following formula (6):

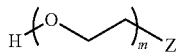

(6)

wherein Z and m are as defined above,
with an epoxy group-containing compound represented by the following formula (7):

$$P-L^3 \qquad (7)$$

wherein $L^3$ is as defined above and P is a monovalent organic group which has 2 to 7 carbon atoms and has an epoxy group,
to obtain the secondary alcohol compound represented by the formula (4).

15. The method according to claim 14, wherein the (meth)acryl group-containing compound is selected from 2-isocyanatoethyl methacrylate, 2-isocyanatoethyl acrylate, methacryloyl chloride, and acryloyl chloride.

16. The method according to any one of claims 12 to 14, wherein Z is a monovalent organic group which has 1 to 10 carbon atoms and has an amide bond, an alkoxy group, a dimethylamino group, an alkyl dimethyl ammonium group or a sulfobetaine group.

17. The method according to claim 16, wherein the (meth)acryl group-containing compound is selected from 2-isocyanatoethyl methacrylate, 2-isocyanatoethyl acrylate, methacryloyl chloride, and acryloyl chloride.

18. The method according to claim 13, wherein the (meth)acryl group-containing compound is selected from 2-isocyanatoethyl methacrylate, 2-isocyanatoethyl acrylate, methacryloyl chloride, and acryloyl chloride.

19. The method according to claim 12, wherein the (meth)acryl group-containing compound is selected from 2-isocyanatoethyl methacrylate, 2-isocyanatoethyl acrylate, methacryloyl chloride, and acryloyl chloride.

* * * * *